United States Patent [19]

Morimoto et al.

[11] Patent Number: 5,748,406
[45] Date of Patent: May 5, 1998

[54] ROTATIONAL DRIVING APPARATUS FOR DISKS HAVING A MAGNET DISPOSED ON A MOTOR MOUNTING BASE SURFACE TO ABSORB RADIAL DEFLECTIONS

[75] Inventors: Takao Morimoto; Tatsunori Fujiwara, both of Tokyo, Japan

[73] Assignee: Mitsubishi Denki Kabushiki Kaisha, Tokyo, Japan

[21] Appl. No.: 747,568

[22] Filed: Nov. 12, 1996

[30] Foreign Application Priority Data

Jun. 18, 1996 [JP] Japan .................... 8-157263

[51] Int. Cl.$^6$ .................... G11B 23/00; G11B 25/04
[52] U.S. Cl. .................... 360/99.12; 369/263; 369/264; 369/270
[58] Field of Search .................... 369/263, 264, 369/270, 271; 360/99.05, 99.12

[56] References Cited

U.S. PATENT DOCUMENTS

| | | | |
|---|---|---|---|
| 3,751,044 | 8/1973 | Sawada | 369/263 |
| 4,730,299 | 3/1988 | Kamoshita et al. | 369/264 |
| 4,951,277 | 8/1990 | Masunaga et al. | 369/270 |
| 5,218,598 | 6/1993 | Chiba | 369/263 |

FOREIGN PATENT DOCUMENTS

| | | |
|---|---|---|
| 0439957 | 8/1991 | European Pat. Off. . |
| 1-253864 | 10/1989 | Japan . |
| 9110996 | 7/1991 | WIPO . |

Primary Examiner—Stuart S. Levy
Assistant Examiner—William J. Klimowicz

[57] ABSTRACT

A rotational driving apparatus for disks includes a motor mounting base, a motor attached to the motor mounting base, a turn table made of a non-magnetic material and attached to a rotational shaft of the motor, for supporting a disk thereon, a turn table magnet disposed on the turn table, for absorbing the disk placed on the turn table, and a magnetic plate member disposed on the motor mounting base and under the turn table, thereby generating a transverse force exerted on the rotational motor shaft due to a magnetic force of the turn table magnet which acts on the magnetic plate member so as to tilt the rotational motor shaft.

8 Claims, 7 Drawing Sheets

ROTATIONAL DRIVING APPARATUS FOR DISKS HAVING A MAGNET DISPOSED ON A MOTOR MOUNTING BASE SURFACE TO ABSORB RADIAL DEFLECTIONS

BACKGROUND OF THE INVENTION

1. Field of the Invention

The present invention relates to a rotational driving apparatus used for disks, for recording and/or replaying an information signal using an optical disk, a magneto-optic disk, or the like. More particularly, it relates to a rotational driving apparatus for disks which can absorb radial deflections of a rotational driving motor used for disks.

2. Description of the Prior Art

Referring now to FIG. 9, it illustrates a perspective view showing a prior art rotational driving apparatus for disks. Furthermore, FIG. 10 shows a plan view of FIG. 9, and FIG. 11 shows a cross-sectional view taken along the line D—D of FIG. 10. In the figures, reference numeral 1 denotes a motor mounting base shaped like a base plate, 2 denotes a motor used for rotationally driving a disk, which is mounted and secured to the motor mounting base 1, and 3 denotes a rotational motor shaft, which extends vertically through and above the motor mounting base 1.

Furthermore, reference numeral 4 denotes a turn table on which a disk is placed, which is secured to an upper end of the rotational motor shaft 3, and 5 denotes a turn table magnet shaped like a planar disk, which is mounted on the turn table 4. Opposite surfaces of the turn table magnet 5 in the direction of the rotational motor shaft 2 are magnetized, so that a disk placed on the turn table 4 can stick firmly onto the turn table 4.

Reference numeral 9 denotes a helical spring for preventing radial deflections of the rotational motor shaft 3, and 10 denotes a fixing pin mounted on the motor mounting base 1. The helical portion of the spring 9 is engaged with the pin. Furthermore, reference numeral 11 denotes a stopper mounted on the motor mounting base 1 for securing an end of the spring 9 to the motor mounting base 1. The other end of the spring 9 presses the rotational motor shaft 3 transversely.

Reference numeral 21' denotes an urging force of the spring 9 transversely pressing the rotational shaft 3 of the motor. The urging force 21' tilts the rotational shaft 3 of the motor in the direction indicated by the arrow b in FIG. 11 at all times. Reference numeral 22 and 23 denotes radial deflections produced in the rotational shaft 3 of the motor when the urging force 21' does not act on the rotational shaft 3 rotating.

Next, a description will be made as to the operation of the prior art rotational driving apparatus. Since the urging force 21' of the spring 9 tilts the rotational shaft 3 of the motor at all times, the radial deflections designated by the reference numerals 22 and 23, which are produced when the rotational shaft 3 of the motor rotates, can be prevented. Thus, the deflections of a disk which is placed on the turn table 4 and rotates together with the turn table 4 can be suppressed to a minimum.

Although such a prior art rotational driving apparatus having the structure mentioned above effects the purpose of suppressing the deflections of a disk, which is placed on the turn table 4 and rotates together with the turn table 4, to a minimum, it suffers from disadvantages that the spring 9 which abuts on the rotational shaft 3 of the motor wears out, and the friction between the spring 9 and the rotational motor shaft 3 causes an increase in the driving force of the motor 2.

JP-A 1/253864 is one of references which disclose such a prior art technique. A disk supporting apparatus of a disk player disclosed in the reference is adapted to prevent surface vibrations in a direction of surface deflection of a disk on a turn table by forming a projecting portion shaped like an annular ring on a peripheral part of a damper for holding the disk between itself and the turn table, and mounting an annular magnet within the annular-shaped projecting portion, but the apparatus cannot prevent the radial deflections of the rotational motor shaft.

SUMMARY OF THE INVENTION

The present invention is made to overcome the aforementioned problem. More precisely, it is an object of the present invention to provide a rotational driving apparatus for disks with a high degree of reliability, which can prevent radial deflections of a rotational motor shaft efficiently by using a magnetic force of a turn table magnet without the use of a spring for tilting the rotational motor shaft, thereby suppressing deflections of a disk placed on a turn table to a minimum without having to increase a motor driving force.

It is another object of the present invention to provide a rotational driving apparatus for disks with a high degree of reliability, which can prevent radial deflections of a rotational motor shaft more efficiently, thereby suppressing deflections of a disk placed on a turn table to a minimum more effectively.

In accordance with the present invention, there is provided a rotational driving apparatus for disks, including a motor mounting base; a motor attached to the motor mounting base; a turn table made of a non-magnetic material and attached to a rotational shaft of the motor, for placing a disk thereon; a turn table magnet disposed on the turn table, for adsorbing a disk placed on the turn table; and a magnetic plate member disposed on the motor mounting base and under the turn table, for generating a magnetic force in cooperation with the turn table magnet so as to exert a transverse force on the turn table, the transverse force finally acting on the rotational motor shaft, thereby tilting the rotational motor shaft at a certain angle.

In accordance with a preferred embodiment of the present invention, the magnetic plate member is constructed of a magnetic material which is not integral with the motor mounting base, and the magnetic plate member is mounted on and secured to the motor mounting base.

In accordance with a preferred embodiment of the present invention, the magnetic plate member is formed integrally as a part of the motor mounting base and is located under the turn table.

In accordance with a preferred embodiment of the present invention, the magnetic plate member forms a planar projecting portion which protrudes from an upper surface of the motor mounting base so as to get closer to a lower surface of the turn table.

In accordance with a preferred embodiment of the present invention, there is provided a rotational driving apparatus for disks, including a motor mounting base; a motor attached to the motor mounting base; a turn table made of a non-magnetic material and attached to a rotational shaft of the motor, for placing a disk thereon; a turn table magnet disposed on the turn table, for adsorbing the disk placed on the turn table; and a magnet disposed on the motor mounting base and under the turn table, for preventing deflections of the rotational motor shaft, and for generating an adsorption or repulsion force in cooperation with the turn table magnet so as to exert a transverse force on the turn table, the transverse force finally acting on the rotational motor shaft, thereby tilting the rotational motor shaft at a certain angle.

In accordance with a preferred embodiment of the present invention, the magnet for preventing deflections of the rotational motor shaft is a magnet shaped like a planar projecting portion which protrudes from an upper surface of the motor mounting base so as to get closer to a lower surface of the turn table.

Further objects and advantages of the present invention will be apparent from the following description of the preferred embodiments of the invention as illustrated in the accompanying drawings.

DETAILED DESCRIPTION OF THE PREFERRED EMBODIMENTS

A description will be made as to an embodiment of the present invention.

Figure 1:
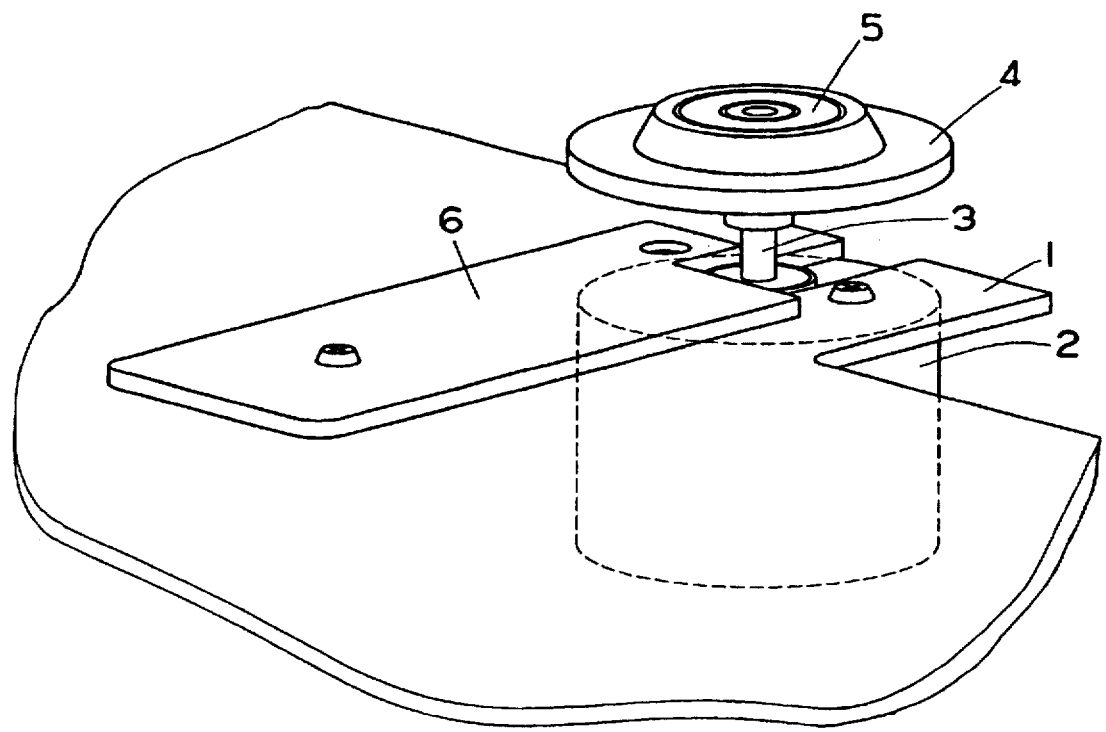
FIG. 1 is a perspective view of a rotational driving apparatus for disks according to a first embodiment of the present invention.
Figure 2:
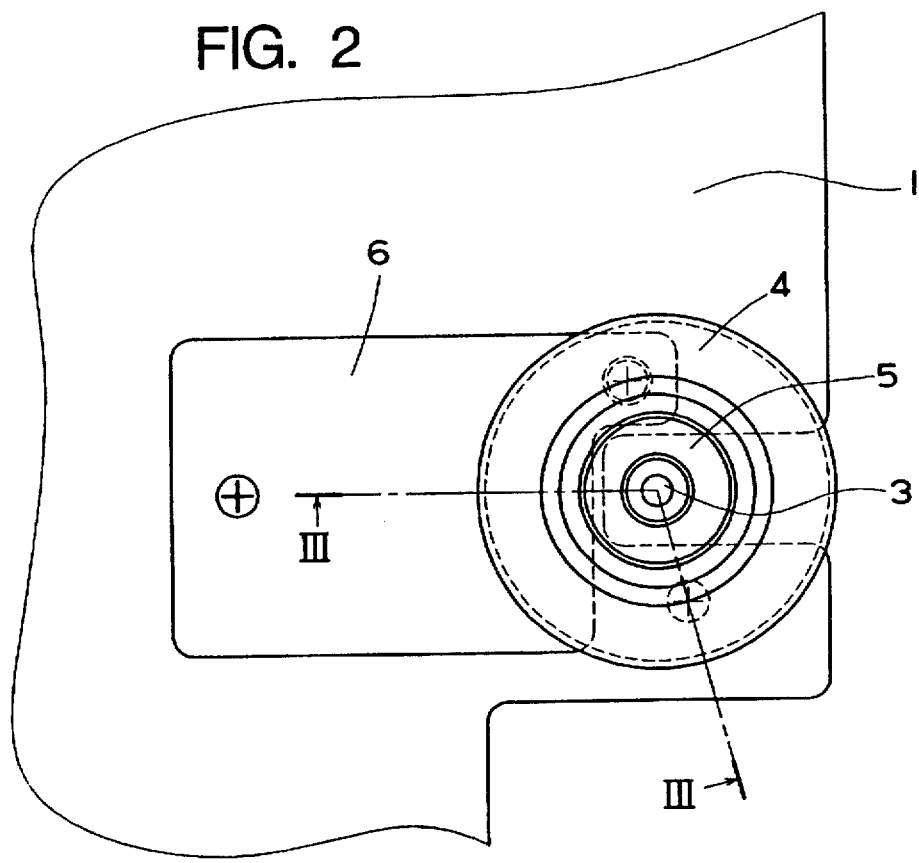
FIG. 2 is a plan view of FIG. 1.
Figure 3:
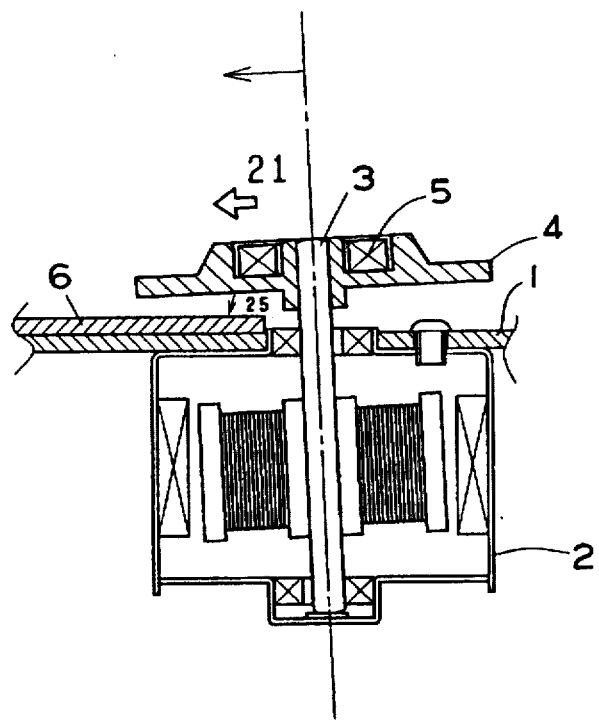
FIG. 3 is a cross-sectional view taken along the line III—III of FIG. 2.

FIG. 1 shows a perspective view of a rotational driving apparatus for disks according to the first embodiment of the present invention, FIG. 2 shows a plan view of FIG. 1, and FIG. 3 shows a cross-sectional view taken along the line III—III of FIG. 2. In the figures, reference numeral 1 denotes a motor mounting base made of a magnetic material or a non-magnetic material, 2 denotes a motor used for rotationally driving a disk, which is mounted and secured to the motor mounting base 1, and 3 denotes a rotational motor shaft, which extends vertically through and above the motor mounting base 1.

Furthermore, reference numeral 4 denotes a turn table made of a non-magnetic material for placing a disk thereon, which is secured to an upper end of the rotational motor shaft 3, and 5 denotes a turn table magnet shaped like a planar and annular ring, which is mounted on the turn table 4. The turn table magnet 5 is adapted to stick a disk placed on the turn table 4 onto the turn table 4.

Reference numeral 6 denotes a magnetic planar plate which is disposed on the motor mounting base 1. The magnetic planar plate 6 is constructed of a magnetic plate which is not integral with the motor mounting base 1 and is mounted on the motor mounting base 1, thereby forming a planar projection on the motor mounting base 1, which is located under the turn table 4.

In the rotational driving apparatus for disks so constructed, an adsorption force designated by the arrow 25 shown in FIG. 3 acts on the magnetic plate member 6, and this results in causing a transverse force 21 exerted on the rotational motor shaft 3 in the turn table 4, thereby tilting the rotational motor shaft 3 at all times.

Next, a description will be made as to the operation of the rotational driving apparatus of the first embodiment. The adsorption force 25 between the turn table magnet 5 and the magnetic plate member 6 causes the transverse force 21 exerted on the turn table 4. Thus, the force transversely acts on the rotational motor shaft 3. This results in tilting the rotational motor shaft 3. Also, while the rotational motor shaft 3 is rotating, the transverse force 21 caused by the adsorption force 25 of the turn table magnet 5 acts on the rotational motor shaft 3 so as to tilt it at a certain angle and keep it in balance. As a result, radial deflections of the rotational motor shaft 3 can be prevented.

Accordingly, deflections of a disk placed on the turn table 4 can be reduced to a minimum and the reliability of rotational driving for disks can be increased. Furthermore, since the magnetic plate member 6 which forms the planar projection on the motor mounting base, as previously mentioned, protrudes from the upper surface of the motor mounting base 1 so as to get closer to the lower surface of the turn table 4, the adsorption force 25 exerted on the magnetic plate member 6 by the magnetic force of the turn table magnet 5 can be generated more effectively.

Figure 4:
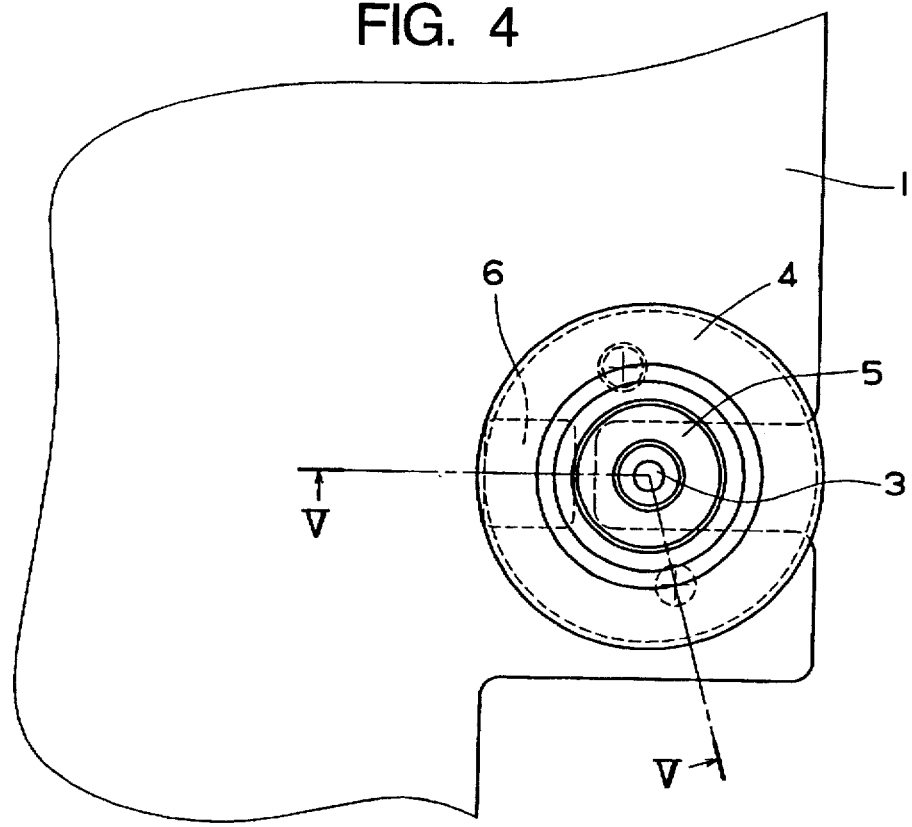
FIG. 4 is a plan view of a rotational driving apparatus for disks according to a second embodiment of the present invention.
Figure 5:
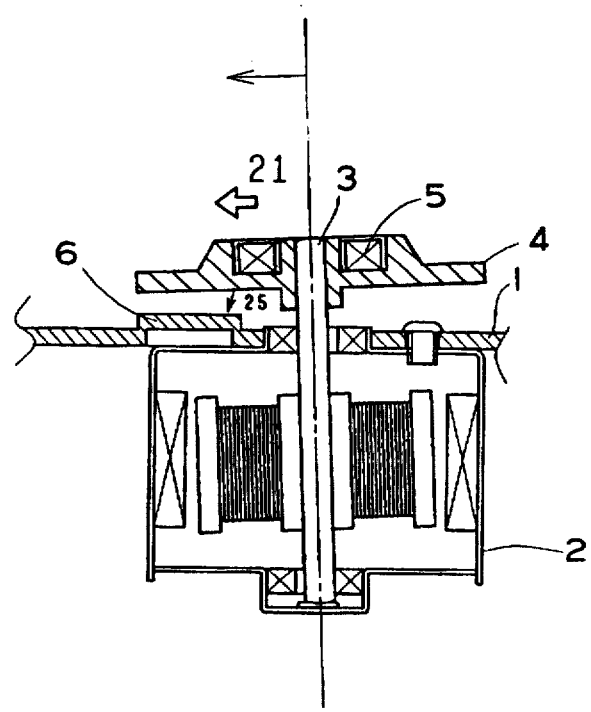
FIG. 5 is a cross-sectional view taken along the line V—V of FIG. 4.

Referring now to FIG. 4, it illustrates a plan view of a rotational driving apparatus for disks according to a second embodiment of the present invention. Furthermore, FIG. 5 shows a cross-sectional view taken along the line V—V of FIG. 4.

In accordance with the first embodiment mentioned above, the magnetic plate member 6 which is not integral with the motor mounting base 1 is mounted on and secured to the motor mounting base 1 and is located under the turn table 4. On the contrary, the magnetic plate member 6 according to the second embodiment is formed integrally on the motor mounting base 1, as shown in FIG. 5. That is, the magnetic plate member 6 is a projecting portion of the motor mounting base, which protrudes from the upper surface of the motor mounting base 1 so as to get closer to the lower surface of the turn table 4. Thus, the second embodiment provides the advantages that it is not necessary to use another magnetic member which is not integral with the motor mounting base 1 and the mounting process of the magnetic plate member can be omitted, as well as the same advantage as that offered by the first embodiment.

In the first and second embodiments, the magnetic plate member 6 is formed as a planar projection. Alternatively, the magnetic plate member 6 of a rotational driving apparatus according to a third embodiment of the present invention can be constructed of a magnetic material such as a corrugated magnetic material, for only causing an adsorption force 25 as shown in FIG. 3 due to the magnetic force of the turn table magnet 5, which results in generating a transverse force 21 exerted on the rotational motor shaft 3. In this case, the same advantages as those offered by the first and second embodiments can be provided.

Figure 6:
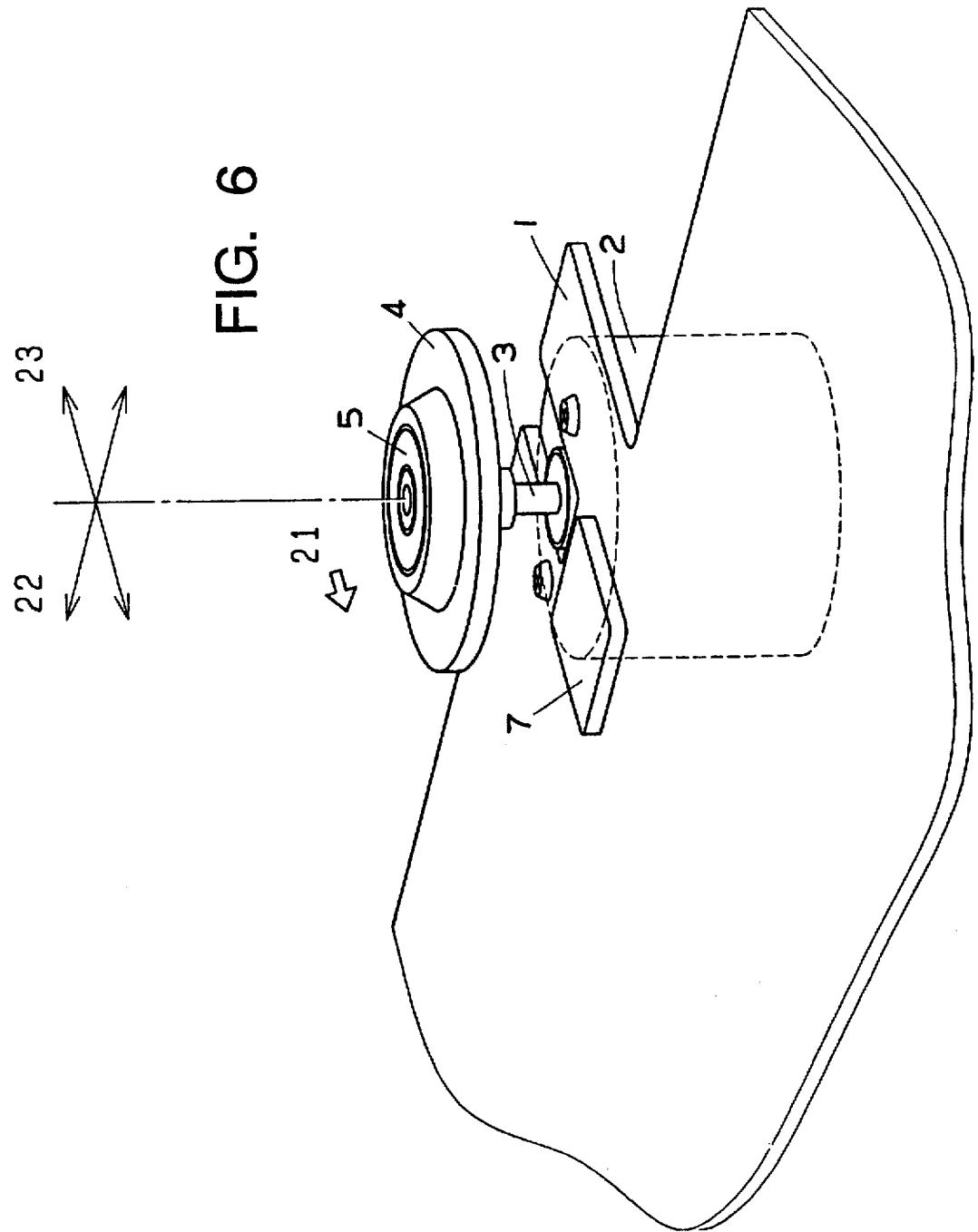
FIG. 6 is a perspective view of a rotational driving apparatus for disks according to a fourth embodiment of the present invention.
Figure 7:
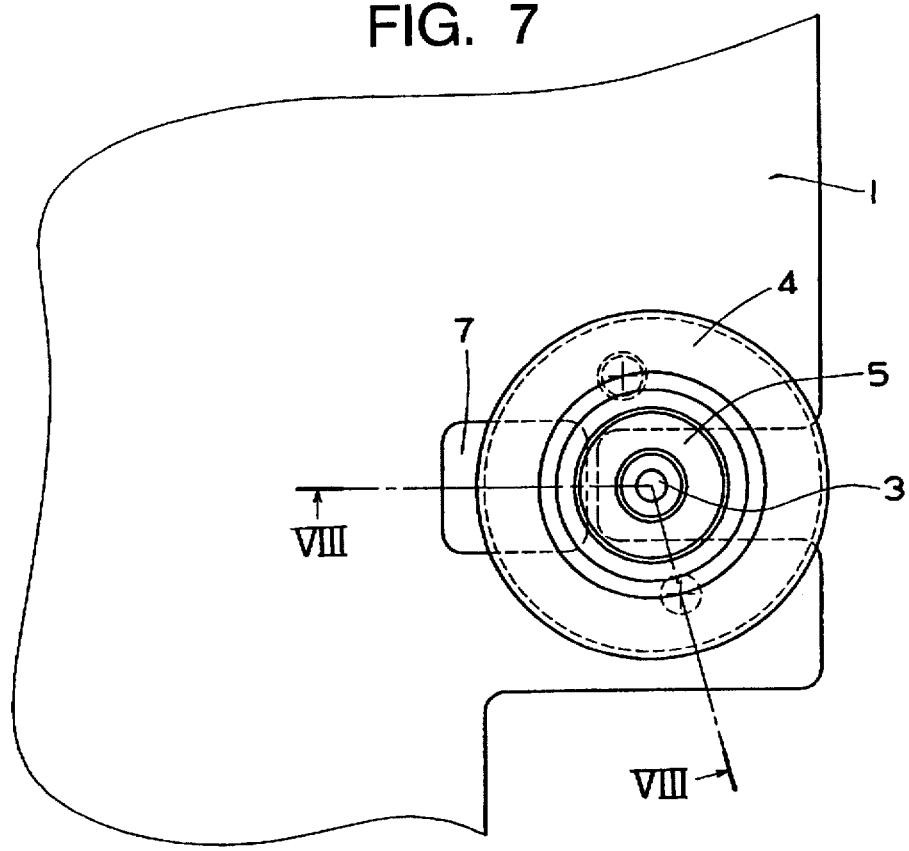
FIG. 7 is a plan view of FIG. 6.
Figure 8:
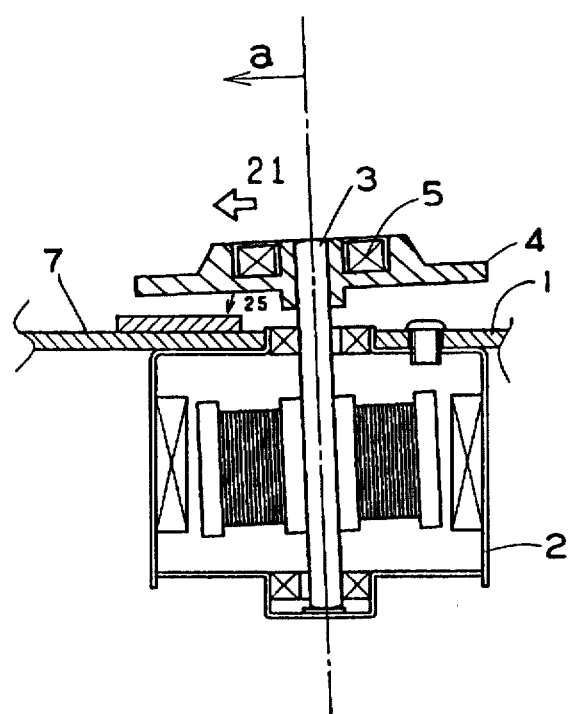
FIG. 8 shows a cross-sectional view taken along the line VIII—VIII of FIG. 7.
Figure 9:
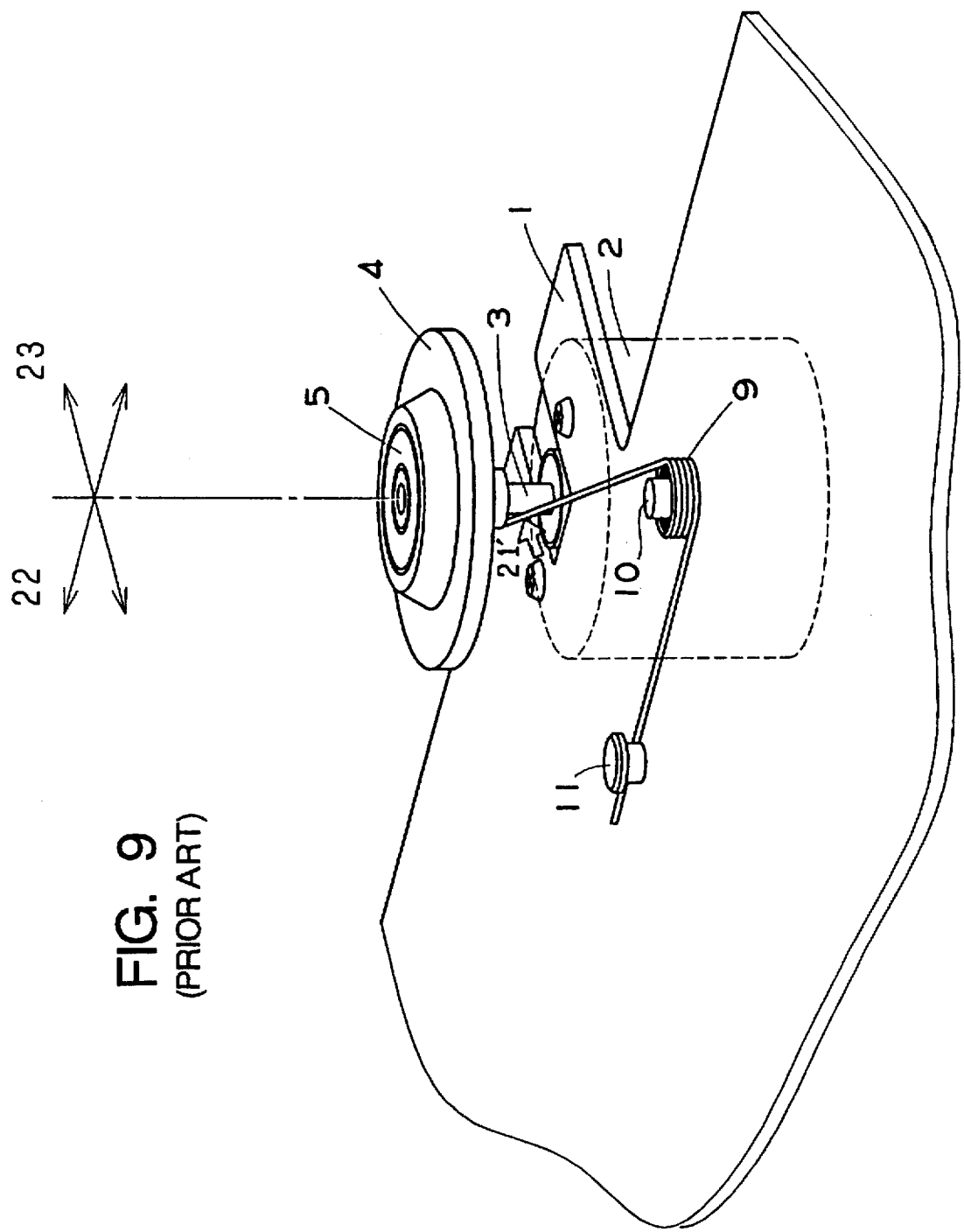
FIG. 9, it illustrates a perspective view showing a prior art rotational driving apparatus for disks.
Figure 10:
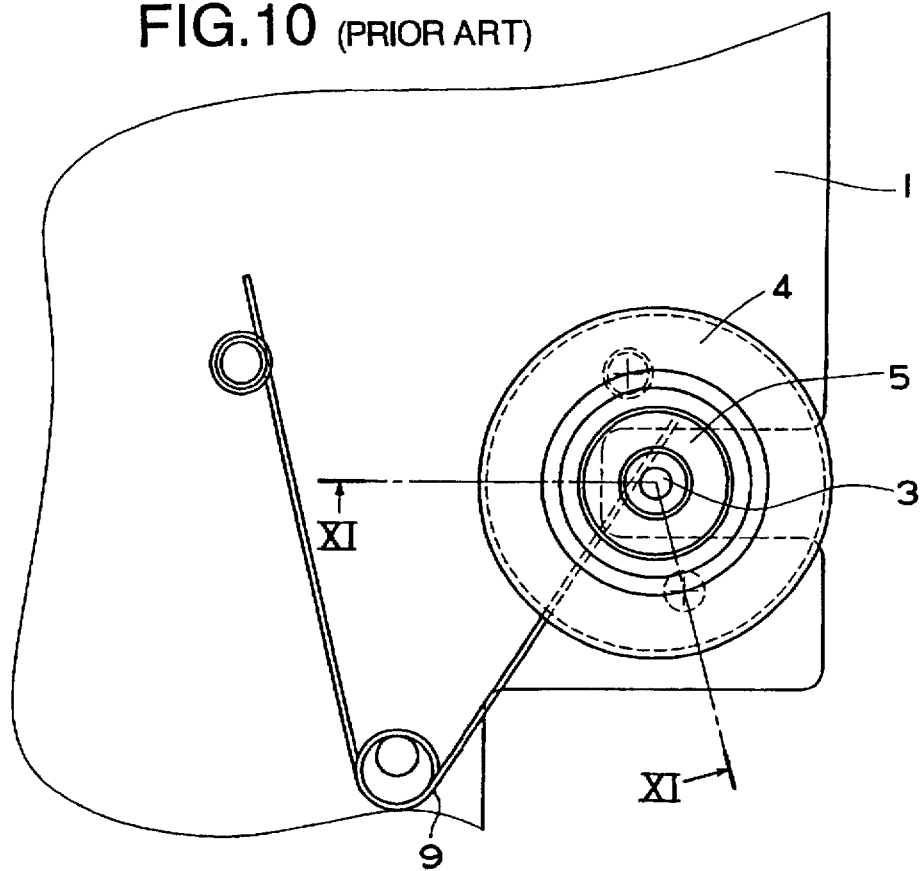
FIG. 10 is a plan view of FIG. 9.
Figure 11:
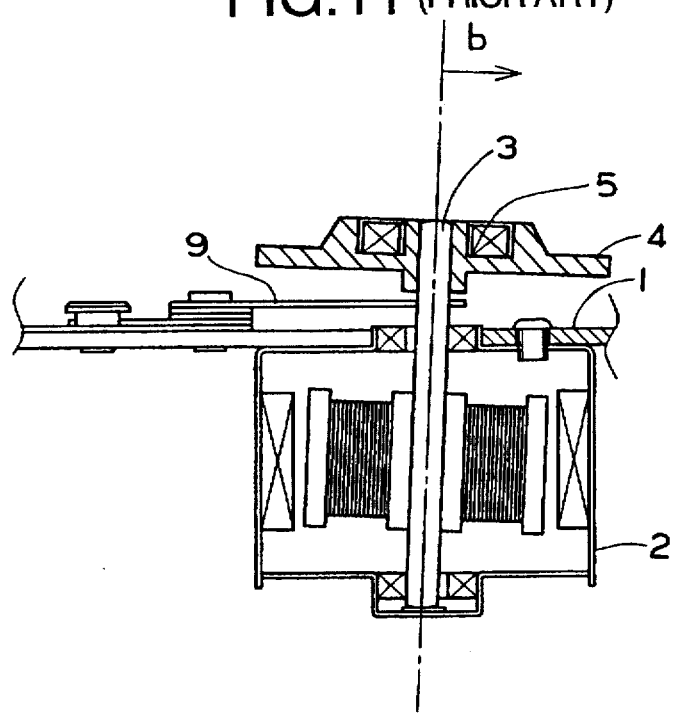
FIG. 11 shows a cross-sectional view taken along the line XI—XI of FIG. 10.

FIG. 6 shows a perspective view of a rotational driving apparatus for disks according to a fourth embodiment of the present invention, FIG. 7 shows a plan view of FIG. 6, and FIG. 8 shows a cross-sectional view taken along the line VIII—VIII of FIG. 7.

In accordance with the aforementioned first and second embodiments, the magnetic plate member 6 is disposed on the motor mounting base 1. On the contrary, according to the fourth embodiment, a magnet 7 for preventing deflections of the motor shaft is disposed on the motor mounting base 1, instead of the magnetic plate member 6. The magnet 7 for preventing deflections of the motor shaft forms a planar projecting member which protrudes from the upper surface of the motor mounting base 1 so as to get closer to the lower surface of the turn table 4.

Next, a description will be made as to the operation of the rotational driving apparatus of the fourth embodiment. An adsorption force 25 or a repulsion force is generated between the turn table magnet 5 and the magnet 7 for preventing deflections of the motor shaft, and this results in causing a transverse force 21 which acts on the turn table 4 and hence the rotational shaft 3. Thus, the transverse force 21 tilts the rotational motor shaft 3 towards the direction designated by the arrow a in FIG. 8.

Even when the rotational motor shaft 3 so tilted rotates, the adsorption force 25 or repulsion force by the turn table magnet 5 also acts on the magnet 7 for preventing deflections of the motor shaft to generate the transverse force 21 which holds the rotational motor shaft 3 tilted at a certain angle and keeps it in balance. As a result, radial deflections of the rotational motor shaft 3 can be prevented. Thus, deflections of a disk perpendicular to the direction of the rotational motor shaft 3 can be reduced to a minimum more effectively than in the aforementioned first and second embodiments.

Next, a description will be made as to a fifth embodiment of the present invention. In accordance with the fourth embodiment mentioned above, the magnet 7 for preventing deflections of the motor shaft which is not integral with the motor mounting base 1 is mounted on and secured to the motor mounting base 1. On the contrary, the magnet 7 for preventing deflections of the motor shaft according to the fifth embodiment is formed integrally on the motor mounting base 1 instead of the magnetic plate member, as shown in FIG. 5. The magnet 7 can be formed by magnetizing a projecting portion of the motor mounting base 1, which protrudes from the upper surface of the motor mounting base 1 so as to get closer to the lower surface of the turn table 4. Thus, the fifth embodiment provides the same advantages as those offered by the fourth embodiment.

In the fourth and fifth embodiments, the magnet 7 for preventing deflections of the motor shaft is formed on the motor mounting base 1 as a planar projection. Alternatively, the magnet 7 for preventing deflections of the motor shaft of the present invention can be constructed of a magnetic in any shape if it can generate an adsorption force 25 or a repulsion force due to the magnetic force of the turn table magnet 5, which results in generating a transverse force 21 which acts on the turn table 4 and hence the rotational motor shaft 3. In this case, the same advantages as those offered by the fourth and fifth embodiments can be provided.

As previously mentioned, the present invention offers the following advantages.

In accordance with a preferred embodiment of the present invention, a magnetic plate member disposed on a motor mounting base and under a turn table is provided and adapted to generate a transverse force exerted on a rotational motor shaft by virtue of a magnetic force of a turn table magnet which acts on the magnetic plate member, thereby tilting the rotational motor shaft. Therefore, since the rotational driving apparatus does not need a spring used for tilting the rotational motor shaft, it can prevent wear in the spring, and an increase in the driving force of the motor caused by a friction between the spring and the rotational motor shaft while preventing radial deflections of the rotational motor shaft by using the magnetic force of the turn table magnet, thereby reducing deflections of a disk placed on the turn table to a minimum and hence improving the reliability.

In accordance with a preferred embodiment of the present invention, the magnetic plate member constructed of a magnetic material which is not integral with the motor mounting base is mounted on and secured to the motor mounting base. Therefore, radial deflections of the rotational motor shaft can be prevented by only attaching the magnetic plate member onto the motor mounting base. Accordingly, deflections of a disk placed on the turn table can be reduced to a minimum, and hence the reliability of the apparatus can be improved.

In accordance with a preferred embodiment of the present invention, the magnetic plate member is formed integrally with the motor mounting base. Therefore, radial deflections of the rotational motor shaft can be prevented without having to use another magnetic material which is not integral with the motor mounting base. Accordingly, deflections of a disk placed on the turn table can be reduced to a minimum, and hence the reliability of the apparatus can be improved.

In accordance with a preferred embodiment of the present invention, the magnetic plate member forms a planar projecting portion which protrudes from an upper surface of the motor mounting base so as to get closer to a lower surface of the turn table. Therefore, radial deflections of the rotational motor shaft can be prevented more effectively by using the magnetic force of the turn table magnet more efficiently.

In accordance with a preferred embodiment of the present invention, a magnet disposed on the motor mounting base and under the turn table for preventing deflections of the rotational motor shaft is provided instead of the magnetic plate member and adapted to generate a transverse force exerted on the rotational motor shaft by virtue of an adsorption force or a repulsion force between the turn table magnet and the magnet, thereby tilting the rotational motor shaft. Therefore, since the rotational driving apparatus does not need a spring used for tilting the rotational motor shaft, it can prevent wear in the spring, and an increase in the driving force of the motor caused by a friction between the spring and the rotational motor shaft while preventing radial deflections of the rotational motor shaft by using an adsorption force or a repulsion force between the turn table magnet and the magnet for preventing deflections of the rotational motor shaft, thereby reducing deflections of a disk placed on the turn table to a minimum and hence improving the reliability of the apparatus.

In accordance with a preferred embodiment of the present invention, the magnet for preventing deflections of the rotational motor shaft forms a planar projecting portion which protrudes from an upper surface of the motor mounting base so as to get closer to a lower surface of the turn table. Therefore, radial deflections of the rotational motor shaft can be prevented more effectively by using an adsorption force or a repulsion force between the turn table magnet and the magnet for preventing deflections of the rotational motor shaft.

Many widely different embodiments of the present invention may be constructed without departing from the spirit and scope of the present invention. It should be understood that the present invention is not limited to the specific embodiments described in the specification, except as defined in the appended claims.

What is claimed is:

1. A rotational driving apparatus for disks, comprising:

a motor mounting base;

a motor attached to said motor mounting base;

a turn table made of a non-magnetic material and attached to a rotational motor shaft, for supporting a disk thereon;

a turn table magnet disposed on said turn table, for holding a disk placed on said turn table; and a magnetic plate member disposed on an uppermost surface of said motor mounting base and under said turn table so as to protrude from the uppermost surface of said motor mounting base toward a lower surface of said turn table, for generating a magnetic force in cooperation with said turn table magnet so as to exert a transverse force on said turn table, the transverse force acting on said rotational motor shaft, thereby tilting said rotational motor shaft at a certain angle.

2. The rotational driving apparatus for disks according to claim 1, wherein said magnetic plate member is constructed of a magnetic material which is not integral with said motor mounting base, and said magnetic plate member is mounted on and secured to said motor mounting base.

3. The rotational driving apparatus for disks according to claim 1, wherein said magnetic plate member is formed integrally on said motor mounting base.

4. The rotational driving apparatus for disks according to claim 1, wherein said magnetic plate member forms a planar projecting portion which protrudes from an upper surface of said motor mounting base so as to extend toward a lower surface of said turn table.

5. The rotational driving apparatus for disks according to claim 2, wherein said magnetic plate member forms a planar projecting portion which protrudes from an upper surface of said motor mounting base so as to extend toward a lower surface of said turn table.

6. The rotational driving apparatus for disks according to claim 3, wherein said magnetic plate member forms a planar projecting portion which protrudes from an upper surface of said motor mounting base so as to extend toward a lower surface of said turn table.

7. A rotational driving apparatus for disks, comprising:

a motor mounting base;

a motor attached to said motor mounting base;

a turn table made of a non-magnetic material and attached to a rotational motor shaft, for supporting a disk thereon;

a turn table magnet disposed on said turn table, for holding the disk placed on said turn table; and a magnet disposed on an uppermost surface of said motor mounting base and under said turn table so as to protrude from the uppermost surface of said motor mounting base toward a lower surface of said turn table, for preventing deflections of said rotational motor shaft, and for generating an attraction or repulsion force in cooperation with said turn table magnet so as to exert a transverse force on said turn table, the transverse force acting on said rotational motor shaft, thereby tilting said rotational motor shaft at a certain angle.

8. The rotational driving apparatus for disks according to claim 7, wherein said magnet for preventing deflections of said rotational motor shaft is a magnet shaped like a planar projecting portion which protrudes from an upper surface of said motor mounting base so as to extend toward a lower surface of said turn table.

* * * * *